March 18, 1930.  R. S. RICHARDSON  1,750,649
SYNTHETIC PRODUCTION OF AMMONIA
Filed March 12, 1927
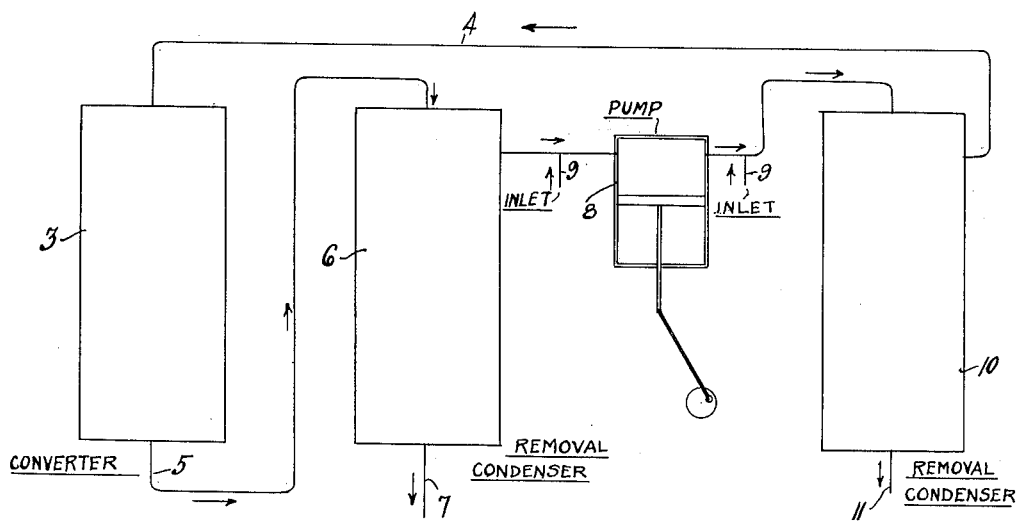
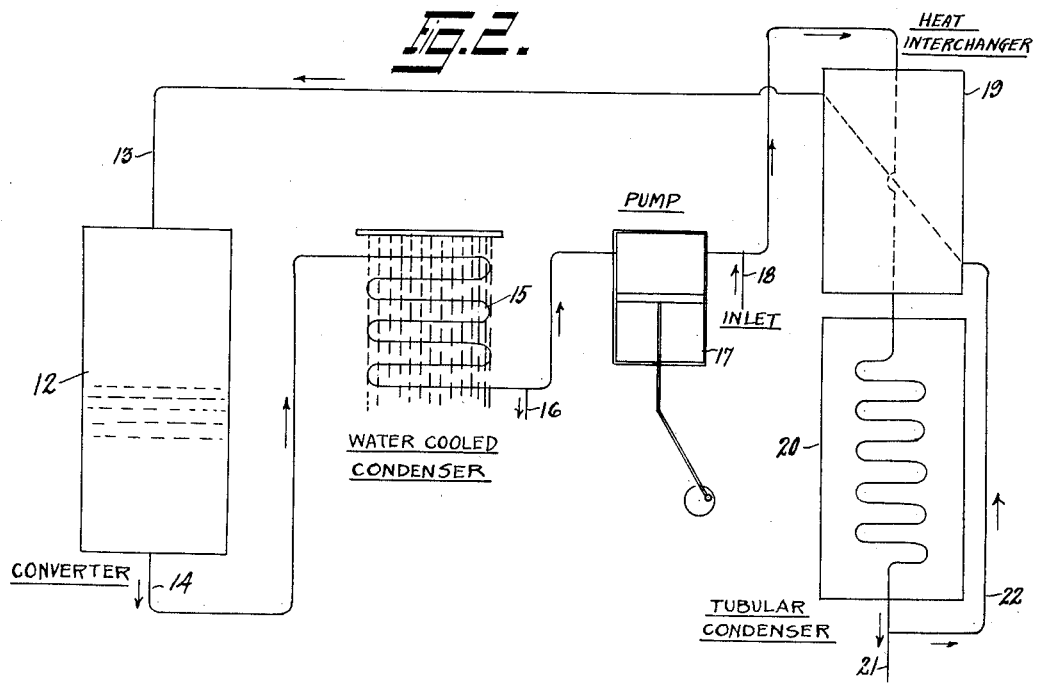
INVENTOR
RALPH S. RICHARDSON.
BY
*Philip B. Reh*
ATTORNEY Patented Mar. 18, 1930

1,750,649

UNITED STATES PATENT OFFICE

RALPH S. RICHARDSON, OF TEANECK, NEW JERSEY, ASSIGNOR TO CHEMICAL ENGINEERING CORPORATION, OF NEW YORK, N. Y., A CORPORATION OF DELAWARE

SYNTHETIC PRODUCTION OF AMMONIA

Application filed March 12, 1927. Serial No. 174,904.

My invention relates particularly to improved methods of withdrawing ammonia products as formed in the converter from the ammonia-containing gases which are conducted under pressure through the circulation system.

In the process of producing ammonia by a circulation of a gaseous mixture of nitrogen and hydrogen under pressure through a suitable catalytic agent with subsequent removal of ammonia, I have found certain advantages in new and useful methods of withdrawing the ammonia products from the circulation system.

Instead of removing the entire production of ammonia from the circulating gases at one point either before or after the circulating pump, I have found it advantageous to separate and remove one part of the ammonia product prior to the entry of the gases into the circulator, while the remainder of the product is taken out of the system after the gases have passed through the circulator. Although this would seem to complicate unnecessarily the ammonia synthesis by installation of two pieces of equipment where one had been used previously, nevertheless, the practical advantages and results obtained outweigh the disadvantages of such extra equipment.

By my method a portion which in many instances may constitute the greater part of the ammonia product can be removed between the catalyst containing converter and the circulator and so be uncontaminated by any impurities other than dissolved gases, while the remaining portion which is removed after passing through the circulator can be made to contain all absorbable and/or condensable impurities introduced into the circulating gases derived either from the oil used to lubriate the circulator or from the makeup gas. The fresh or makeup gas may be introduced into the circulation system between the two points of ammonia removal, or if sufficiently purified to prevent contamination of the pure product, such fresh gas mixture may be introduced at any other point in the circulation.

Another feature of my improved processes lies in the fact that one portion of ammonia can be removed conveniently in one form and the remaining portion in an entirely different form. As for example, the ammonia removal prior to the circulator may be effected by solution in a suitable solvent, while the ammonia removal after the circulator may be accomplished by liquefaction or other methods.

Although my invention is not limited to the pressure employed or to the means used for removal of the ammonia product, I have found it preferable to operate at pressures from 100 to 300 atmospheres and to condense and remove the ammonia product in the liquid form.

The accompanying drawings illustrate in diagrammatic form methods of practicing my invention without defining its limits.

Referring to the Fig. 1 apparatus showing my improved methods, the nitrogen-hydrogen mixture, at the proper pressure and temperature is introduced into the catalyst-containing converter 3 through the inlet pipe 4 and then passes downwardly through the catalytic body and thereafter passes out of the converter 3 at the outlet 5. Leaving the converter 3 the gases in circulation contain a concentration of ammonia gas dependent upon the pressure and other operating conditions in the ammonia synthesis. According to my improved methods part of this ammonia is then removed from the circulation system in the removal condenser 6 through the withdrawal outlet 7. This ammonia product so withdrawn is uncontaminated by oil from the circulator or other impurities introduced with the fresh gaseous mixture. The remaining ammonia gases leaving the condenser 6 now pass through the circulating pump 8 and are preferably augmented by fresh gas entering the system through the inlet pipes 9 which may be placed on either side of the pump 8. The resulting gas mixture then passes through the second removal condenser 10 where the balance of the ammonia produced in the converter 3 is separated from the gas mixture in such condenser 10 and is then withdrawn from the circulation system by the outlet 11 along with whatever absorbable and/or condensable impurities may be introduced into the mixture by passing through the pump 8 or from the unpurified fresh gas introduced through the pipes 9 or from both sources combined. By such procedure the ammonia produced is segregated and removed from the system at two separate points whereby one portion is withdrawn directly following the ammonia synthesis and is uncontaminated with impurities, while the remaining portion thereafter withdrawn carries with it the various absorbable and/or condensable impurities introduced into the circulation system.

Fig. 2 shows my improved methods as applied to the synthetic ammonia process operating at a pressure of about 200 atmospheres.

The nitrogen-hydrogen mixture is conducted to the catalyst-containing converter 12 through the inlet 13 and passes downwardly through the catalytic body in the usual manner and then the synthesized ammonia gases leave the converter 12 through the outlet 14 at a temperature of about 150° C. containing approximately 14% $NH_3$ by volume; such gases then pass through the water-cooled condenser 15 where the temperature is reduced to about 10° C. and the percentage of ammonia in the circulating gases is reduced to about 7% by volume. From the condenser 15 a portion of the product condensed as liquid anhydrous ammonia is withdrawn from the circulation system through the outlet 16. The gases leaving the condenser 15 pass through the circulating pump 17 and are increased in volume by the fresh gas supply entering the system through the pipe 18. Such gases now pass through the heat interchanger 19 in which the gases are cooled with the production of liquefied ammonia by indirect transfer of heat and the products are passed into the tubular condenser 20 cooled by the expansion of liquid ammonia. The portion of ammonia product withdrawn from the condenser 20 through the outlet 21 contains whatever absorbable and/or condensable impurities that were introduced into the circulating gases from the pump 17 as well as from the fresh gas entering the system through the pipe 18. The gases leaving the condenser 20 through the outlet pipe 22 connected directly with the inlet 13 contain about 2% $NH_3$ and are at a temperature of about −20° C.

In both examples shown and described the ammonia products are removed at two points in the circulating system in such a manner as to separate and localize the impurities at one point and so as to give two different forms of product as withdrawn from the system.

I claim as my invention:—

1. In the synthetic production of ammonia, the steps which consist first in removing a greater portion of the ammonia products after the ammonia synthesis, and then in removing another portion after fresh gases have been introduced into the circulation system of the synthesizable gases.

2. In the synthetic production of ammonia, the method of removing ammonia products from the circulation system which comprises condensing the synthesized ammonia gases to liquid anhydrous ammonia and removing the latter from the system, then adding fresh gases to the gases in the circulation system, then cooling the resultant gases with production of liquefied ammonia, and finally removing the latter along with condensable impurities which may have been introduced into the system.

3. In the synthetic production of ammonia, the steps which consist first in removing a portion of the ammonia products after ammonia synthesis, then adding fresh gases to the synthesizable gases in the circulation system, and thereafter in removing another portion of the ammonia products along with whatever impurities which may have been carried in said circulation system of the synthesizable gases.

4. In the synthetic production of ammonia, the steps which consist first in removing a greater portion of the ammonia products after ammonia synthesis, then adding fresh gases to the synthesizable gases in the circulation system, and thereafter in removing another portion of the ammonia products along with whatever impurities which may have been carried in said circulation system of the synthesizable gases.

5. In the synthetic production of ammonia, the steps which consist first in removing a greater portion of the ammonia products after ammonia synthesis, then adding fresh gases to the synthesizable gases in the circulation system, and thereafter in removing another, but lesser, portion of the ammonia products along with whatever impurities which may have been carried in said circulation system of the synthesizable gases.

6. In the synthetic production of ammonia, the steps which consist first in removing from the circulation system a portion of the liquid anhydrous ammonia produced in the ammonia synthesis, then adding fresh gases to the synthesizable gases in the system, and thereafter in removing another relatively more impure portion of the ammonia products along with whatever impurities which may have been carried into said system of the synthesizable gas.

7. In the synthetic production of ammonia, the steps which consist first in removing a portion of the ammonia products after ammonia synthesis, then adding fresh gases to the synthesizable gases in the circulation system, thereafter cooling the circulating gases to produce liquefied ammonia, and thereafter in removing another portion of the ammonia products along with whatever impurities which may have been carried in said circulation system of the synthesizable gases.

RALPH S. RICHARDSON.